(12) United States Patent
Burgin et al.

(10) Patent No.: US 9,020,664 B2
(45) Date of Patent: Apr. 28, 2015

(54) METHODS AND SYSTEMS FOR DISPLAYING PROCEDURE INFORMATION ON AN AIRCRAFT DISPLAY

(71) Applicant: Honeywell International Inc., Morristown, NJ (US)

(72) Inventors: Roger W. Burgin, Scottsdale, AZ (US); Pramod Kumar Malviya, Karnataka (IN); Dave Pepitone, Sun City West, AZ (US); Jerry Ball, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 62 days.

(21) Appl. No.: 13/862,633

(22) Filed: Apr. 15, 2013

(65) Prior Publication Data
US 2014/0309817 A1    Oct. 16, 2014

(51) Int. Cl.
| | |
|---|---|
| G01C 21/30 | (2006.01) |
| B64D 45/00 | (2006.01) |
| G08G 5/00 | (2006.01) |
| G06G 7/76 | (2006.01) |
| G08G 5/02 | (2006.01) |

(52) U.S. Cl.
CPC ............. B64D 45/00 (2013.01); G08G 5/0021 (2013.01); G08G 5/0039 (2013.01); G08G 5/0078 (2013.01); G08G 5/0086 (2013.01); G08G 5/0091 (2013.01); G08G 5/025 (2013.01)

(58) Field of Classification Search
USPC ............... 701/3, 120, 123, 415, 450, 411; 715/702, 809; 340/945
See application file for complete search history.

(56) References Cited

U.S. PATENT DOCUMENTS

| | | | |
|---|---|---|---|
| 5,615,118 | A | 3/1997 | Frank |
| 5,878,368 | A | 3/1999 | DeGraaf |
| 6,112,141 | A | 8/2000 | Briffe et al. |
| 6,266,610 | B1 | 7/2001 | Schultz et al. |
| 6,289,277 | B1 | 9/2001 | Feyereisen et al. |
| 6,732,048 | B2 | 5/2004 | Blewitt |
| 7,606,658 | B2 | 10/2009 | Wise et al. |

(Continued)

FOREIGN PATENT DOCUMENTS

| | | |
|---|---|---|
| EP | 1916503 A2 | 4/2008 |
| EP | 2533015 A2 | 12/2012 |

OTHER PUBLICATIONS

EP Search Report for Application No. 14162953.5 dated Oct. 31, 2014.

(Continued)

*Primary Examiner* — Tan Q Nguyen
(74) *Attorney, Agent, or Firm* — Ingrassia Fisher & Lorenz, P.C.

(57) ABSTRACT

A method for displaying a flight path navigational procedure includes, but is not limited to, detecting with a position detecting system a current location of the aircraft, obtaining from an electronic storage device a plurality of flight path navigation procedures available for a geographic location, determining with a flight path analysis system a preferred flight path that will be taken by the aircraft, and displaying on a display unit a moving map corresponding with the current location of the aircraft and further displaying a depiction of the plurality of flight path navigation procedures on the moving map. The preferred flight path is displayed with a visual cue that visually differentiates the preferred flight path from the other flight paths of the plurality of flight path navigation procedures.

20 Claims, 6 Drawing Sheets

(56) References Cited

U.S. PATENT DOCUMENTS

| | | |
|---|---|---|
| 7,783,417 B2 | 8/2010 | Vavrus |
| 7,953,551 B2 | 5/2011 | Park et al. |
| 8,265,801 B2 | 9/2012 | McCullough et al. |
| 2006/0142904 A1 | 6/2006 | Caillaud et al. |
| 2007/0021905 A1* | 1/2007 | Takashima et al. ........... 701/201 |
| 2007/0262855 A1 | 11/2007 | Zuta et al. |
| 2008/0125962 A1 | 5/2008 | Wipplinger et al. |
| 2010/0106346 A1 | 4/2010 | Badli et al. |
| 2010/0250026 A1* | 9/2010 | Deker et al. ...................... 701/3 |
| 2011/0184595 A1 | 7/2011 | Albert et al. |
| 2012/0179361 A1* | 7/2012 | Mineta et al. ................. 701/410 |
| 2013/0317739 A1* | 11/2013 | Coulmeau et al. ............ 701/465 |

OTHER PUBLICATIONS

EP Examination Report for Application No. 14162953.5 dated Nov. 18, 2014.

\* cited by examiner

METHODS AND SYSTEMS FOR DISPLAYING PROCEDURE INFORMATION ON AN AIRCRAFT DISPLAY

TECHNICAL FIELD

The present invention generally relates to aviation, and more particularly relates to systems and methods for displaying procedure information on an aircraft display.

BACKGROUND

Paper-based charts have been used for decades to assist a pilot and/or other members of an aircrew with navigation of an aircraft. Paper-based charts (which also include PDF files depicting such charts) contain navigation procedures that an aircraft is required to follow at various stages throughout a flight. A procedure is a maneuver that an aircraft is required to undertake when it reaches a predetermined position. For example, a paper-based chart may include a depiction of a flight path together with annotations that indicate the course and the altitude that an aircraft is required to fly and maintain when approaching an airfield for landing. Another example would include the courses and altitude an aircraft may be required to fly and maintain while in a holding pattern above an airport when awaiting clearance to land.

Over the years, as aviation technologies have advanced, many new innovations have made their way into the cockpit. Several innovations have been introduced that facilitate the navigation of an aircraft. One such innovation is a moving map display system. Such systems are well known in the art and are commonly associated with an aircraft's navigation system. The moving map display system works in conjunction with a position detecting system (e.g., GPS) to depict a map or an emulation of the ground on a display screen in the cockpit of the aircraft. As the aircraft flies along its flight path, the map displayed on the display screen appears to move in a manner that corresponds with the current position and heading of the aircraft, to emulate the passage of terrain beneath the aircraft and to show the current position of the aircraft with respect to the terrain or map.

A recent innovation has been to display procedures from a paper-based chart on the moving map display. Such data driven charts (DDC) have a powerful ability to integrate chart information with aircraft position and flight management system (FMS) procedural routing. Data driven charts currently have the capability to graphically preview (all at once or individually) all procedures arriving into or departing from airports. These include departure, arrival, and instrument approach procedures. This reduces the workload on the pilot by eliminating the need to reference both the paper based chart and the moving map display. Additionally, this combined display eliminates the need for the pilot to mentally transpose the procedure onto the moving map display, thus reducing the pilot's level of task saturation. While combining the procedure from a paper-based chart with a moving map display is useful, there is room for improvement.

One limitation of such a system is the fact that the procedures that are illustrated on a paper-based chart (and, consequently depicted on a moving map display) are generic and do not reflect real-time conditions experienced by the aircraft, such as environmental conditions (e.g., altitude, wind speed, wind direction, etc.), geographic conditions (e.g., terrain, obstructions, etc.), or airspace conditions (e.g., air traffic congestion on departure, arrival, or en route procedures, temporary flight restrictions, etc.) that are experienced by the aircraft as it flies the procedure. Such environmental, geographic, and airspace conditions can have a substantial impact on the time, fuel, and operational cost required to fly the procedure. For example, a tail wind or a head wind may increase or diminish the distance that will actually be traveled by an aircraft when following the published procedure, thus increasing/decreasing the time, fuel, and operational cost required to fly the procedure. Such increased or diminished travel, however, would not be reflected by the procedure that is displayed on the moving map. Rather, the published procedure will remain static.

Accordingly, it is desirable to provide a system that can portray procedure-related information to pilots and/or other aircrew members in a manner that is reflective of real-time conditions of, or encountered by, the aircraft. In addition, it is desirable to provide a system that can compare the time, fuel, and operational cost to fly published procedures taking into account the real-time conditions. Furthermore, other desirable features and characteristics of the present invention will become apparent from the subsequent detailed description of the invention and the appended claims, taken in conjunction with the accompanying drawings and this background of the invention.

BRIEF SUMMARY

Various embodiments of a system and method are disclosed herein for displaying procedure information on a display to assist an aircrew member in the navigation of an aircraft.

In a first, non-limiting embodiment, the system includes, but is not limited to, a moving map display subsystem configured to display a map that moves in a manner that corresponds with a movement of the aircraft, a position detecting subsystem that is configured to detect a current location of the aircraft with respect to a ground surface and to generate a first signal indicative of the current location of the aircraft, and an electronic data storage unit configured to store a plurality of flight path navigation procedures associated with a corresponding plurality of geographic locations. The system further includes a flight path analysis subsystem configured to determine a preferred flight path that will be taken by the aircraft and to generate a second signal indicative of the flight path of the aircraft and a processor operatively coupled with the moving map display subsystem, the position detecting subsystem, the flight path analysis subsystem, and the electronic data storage unit. The processor is configured to receive the first signal from the position detecting subsystem, to receive the second signal from the flight path analysis subsystem, and to retrieve a plurality of flight path navigation procedures from the electronic storage unit, the flight path navigation procedures corresponding with the current location of the aircraft and the flight path of the aircraft. The processor is further configured to command the moving map display subsystem to display a graphic depiction of the plurality of flight path navigation procedures on the moving map display subsystem. The preferred flight path is displayed with a visual cue that visually differentiates the preferred flight path from the other of the plurality of flight paths.

In a second, non-limiting embodiment, the method includes, but is not limited to detecting with a position detecting system a current location of the aircraft, obtaining from an electronic storage device a plurality of flight path navigation procedures available for a geographic location, determining with a flight path analysis system a preferred flight path that will be taken by the aircraft, and displaying on a display unit a moving map corresponding with the current location of the aircraft and further displaying a depiction of the plurality of flight path navigation procedures on the moving map. The preferred flight path is displayed with a visual cue that visually differentiates the preferred flight path from the other flight paths of the plurality of flight path navigation procedures.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments and implementations of the systems and methods for displaying procedure information described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Figure 1:
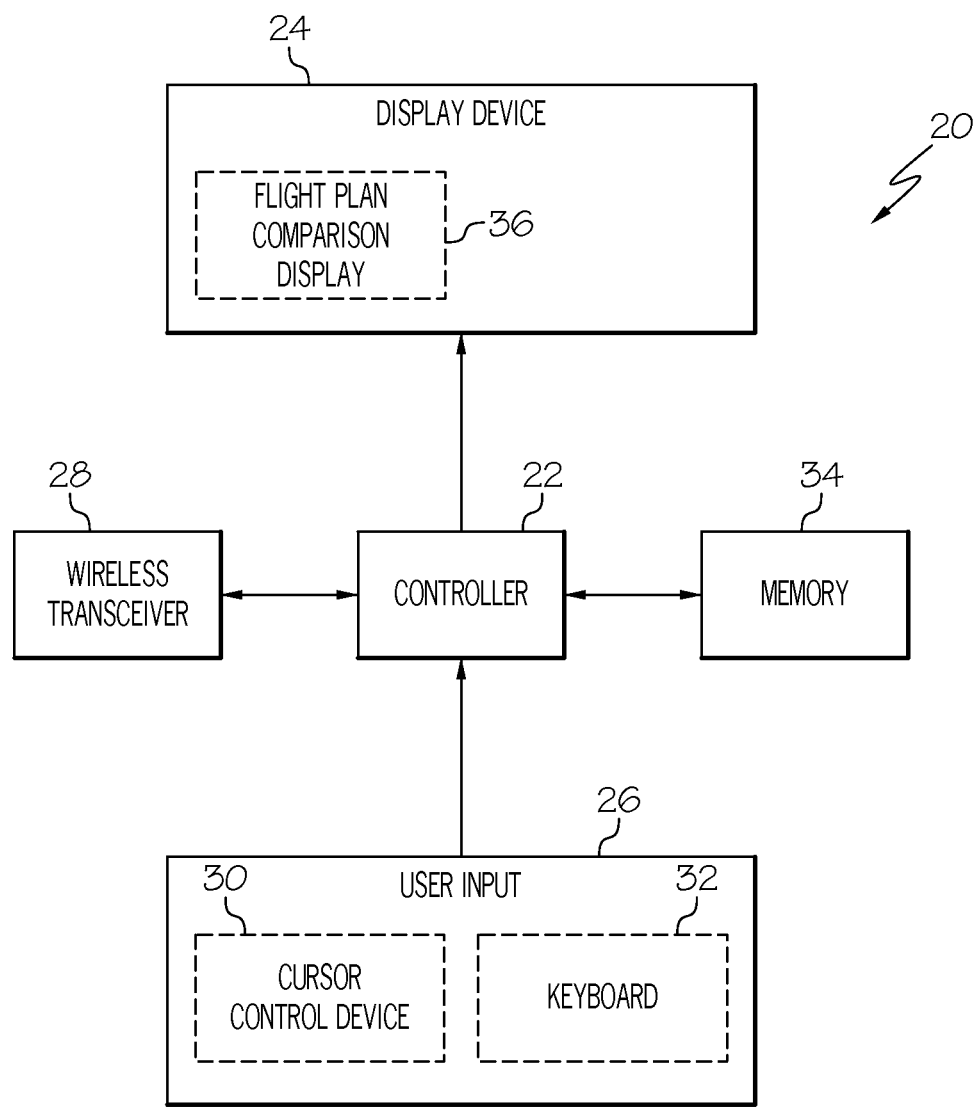
FIG. 1 is a functional block diagram of a flight plan analysis system in accordance with an exemplary embodiment.

FIG. 1 is a generalized block diagram of flight plan analysis system 20 suitable for deployment on an aircraft. Flight plan analysis system 20 includes a controller 22, a display device 24, and a user input 26. Display device 24 is coupled to an output of controller 22, and user input 26 is coupled to an input of controller 22. If desired, a wireless transceiver 28 may also be coupled to controller 22 so as to permit bi-directional communication between controller 22 and a remote data source (e.g., an air traffic control unit). User input 26 may include any device suitable for receiving selection data of the type described herein from a pilot or other user of system 20. For example, as indicated in FIG. 1, user input 26 may include a cursor control device 30 (e.g., a trackball) and a keyboard 32. Similarly, display device 24 may include any image-generating device capable of producing one or more flight plan analysis pages of the type described below. A non-exhaustive list of display devices suitable for use as display device 24 includes cathode ray tube, liquid crystal, active matrix, and plasma display devices. The display device 24 may be touch sensitive such that the user can provide an input by touching an appropriate portion of the display device 24.

A memory 34 is associated with controller 22. Memory 34 stores data related to a group of flight plans associated with the particular aircraft on which flight plan analysis system 20 is deployed. Each flight plan in the group of flight plans may be manually programmed into memory 34 (e.g., utilizing user input 26) or, instead, installed into memory 34 by way of software or wireless uplink (e.g., received via wireless transceiver 28). As noted above, Data Driven Charts ("DDC") provide an environment wherein data related to flight plans is stored into a memory and digitally accessible by a user without the need to access cumbersome paper charts or portable document representations of the paper charts. Any suitable number of flight plans may be stored in memory 34. As used herein, the term flight plan refers to any procedure that may be flown by an aircraft during any phase of flight, including for example departure procedures, en route procedures (both high and low altitude), ocean crossing procedures (such as the North Atlantic Tracks), arrival procedures, holding procedures, runway approach procedures, go-around procedures, and the like.

In addition to memory 34, controller 22 may include, or be associated with, any suitable number of additional conventional electronic components, including, but not limited to, various combinations of microprocessors, flight control computers, navigational equipment, memories, power supplies, storage devices, interface cards, and other standard components known in the art. Furthermore, controller 22 may include, or cooperate with, any number of software programs (e.g., avionics display programs) or instructions designed to carry out the various methods, process tasks, calculations, and control/display functions described below.

As is the case with many conventional flight plan display systems, flight plan analysis system 20 may generate a graphical display on display device 24 indicative of various aspects of a selected flight plan in the group of stored flight plans. However, in contrast to typical flight plan display systems, system 20 may further generate a flight plan analysis display 36 on display device 24 that simultaneously expresses a flight plan preference based on the values of one or more variables associated with multiple flight plans stored in memory 34. As will be described below in detail, flight plan analysis display 36 may express the preference in a variety of manners (e.g., textually, graphically, or cartographically), organize the stored flight plans by the preference, and/or identify the flight plan having the highest preference.

As used herein, the term flight plan preference refers to a particular flight plan out of a plurality of available flight plans that is preferable for one or more reasons. For example, a flight plan may be preferable because flying that flight plan (as opposed to the other available flight plan) will result in the least fuel consumption, because flying that flight plan will require less flying time, and/or because flying that flight plan will incur a lower overall costs (crew cost, fuel consumption costs, time delay costs, etc.; the overall costs may be provided in association with a "cost index" (CI), as is known in the art), among other preferences. As further used herein, the term variable associated with a flight plan refers to any factors that affect the above-noted preferences. For example, variables that may affect fuel consumption, flying time, and overall flying cost include, but are not limited to wind speed and direction, terrain and other obstacles, and/or air traffic in the vicinity of the flight plan, among other variables. The preferences and variable are discussed in greater detail below.

Regarding the flight plan preferences and variables, flight time, fuel consumption, and/or overall operating costs can be calculated according to sensed environmental data, aircraft data, and flight plan data stored in the memory 34. As used herein the terms sensed environmental data and aircraft data refer to the data required to calculate the flight time, fuel consumption, and/or operating costs for flying a particular flight plan and can include, for example, data that is received from a plurality of data sources including data from sensors and information systems onboard the aircraft. Sensor data and onboard information can pertain to any sensed or inferred condition on the aircraft, including but not limited to engine data, avionics data, altitude data, hydraulics data, flight controls data, positional data, fuel data, weather data, and any other types of aircraft data for which a condition can be sensed or derived. Data sources can also include data communications from the ground (such as from air traffic control of from a flight dispatch center), from other aircraft (such as ADS-B data received from a transponder), from information processing systems onboard that process raw data, from reference systems and databases such as manuals and navigation databases, among other sources of data.

Exemplary embodiments of a flight plan analysis display 36 will now be described in conjunction with FIGS. 2-5. Before embarking on a discussion of this example, however, it should be emphasized that the functionality of flight plan analysis system 20 and the appearance of display 36 will inevitably vary amongst embodiments. In the following example, flight plan analysis display 36 is shown and described as including a graphic user interface. However, in alternative embodiments, flight plan analysis display 36 may be produced on a line-based display device (e.g., a conventional Control Display Unit). If system 20 includes a graphical user interface, it will be appreciated that the graphical user interface may accord with ARINC 661 specifications or other such specification protocols. Also, as noted below, embodiments of the invention may be implemented utilizing a software component, such as an ARINC 661 user application definition file.

Figure 2:
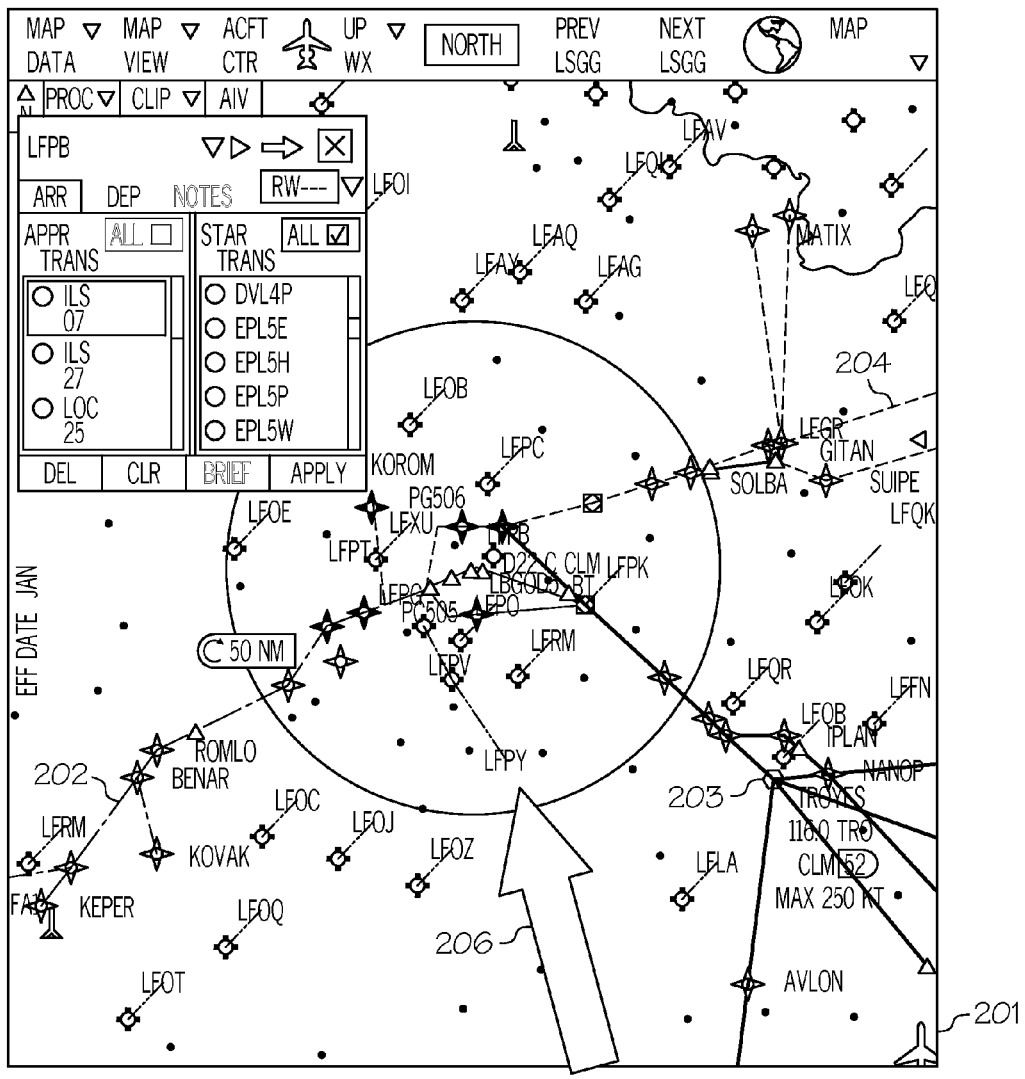
FIGS. 2-5 illustrate exemplary embodiments of a flight plan analysis display.
Figure 3:
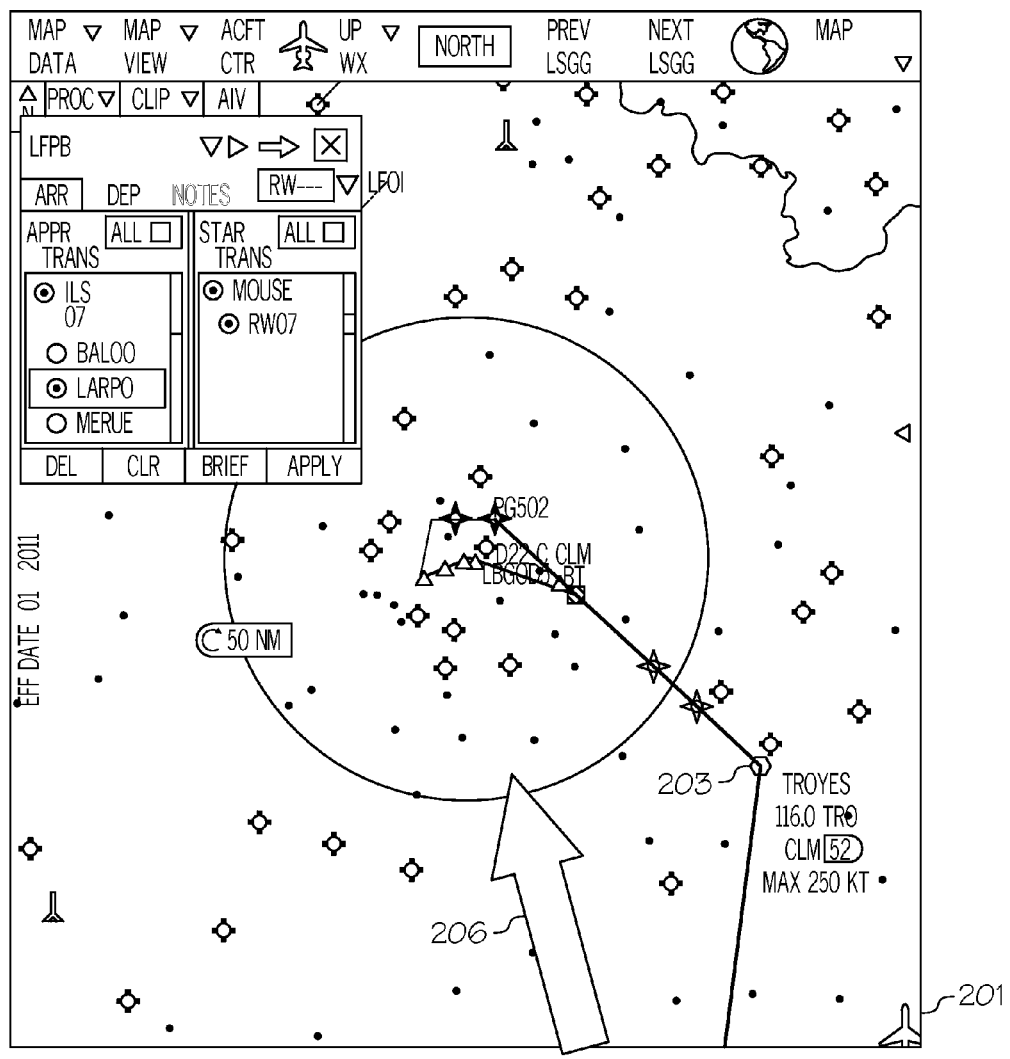

Reference is now made to FIGS. 2 and 3, which provide exemplary flight plan analysis displays for determining a flight plan preference based at least in part on wind speed. FIG. 2 shows a display including an aircraft position 201 and a plurality of flight plans in the form of a plurality of approach procedures 202, 203, and 204. Although not actually provided on the display, wind speed arrow 206 is superimposed on the Figure for purposes of illustration to show the wind speed that has been sensed by one of the aircraft sensors or received in connection with received weather information, as described above. As indicated, the wind for the displayed approach procedures is out of the south-southeast.

Flight plan preferences may be graphically displayed in any number of manners that are capable of indicating a preference. In one example, the flight plans may be displayed in a number of different colors, each color indicating a preference (for example, a ranked order of preferred flight plans). As shown in FIG. 2, the approach procedures 202, 203, and 204 are provided with different line thickness and qualities, wherein the thicker and solid lines indicated the preferred flight plans (again, based on one or more of fuel consumption, flight time, overall operational costs, etc.) based at least in part on the wind speed and direction 206. Of course, any suitable visual differentiation among flight plan illustrations on the display may be used to indicate a preference (for example, different line patterns may also be used). Thus, the user of the flight plan analysis system (e.g., the pilot or co-pilot of the aircraft) may be visually cued to the preferred flight plan, or a ranked order of preferred flight plans, based on the differences in the visual display of the flight plans on the display.

As shown in FIG. 2, because the wind is out of the south-southeast, the flight plan analysis determines that the preferred approach in terms of fuel consumption, flight time, and overall operational costs will be the approach path 203, which generally allows the aircraft to experience a tailwind on its approach into the airport (LFPB—Paris Le Bourget Airport). The thinner dashed lines 204 are less desirable because they are going more against the wind. The thinner solid lines are less desirable because they are perpendicular and somewhat with the wind. The thicker lines 203 are with the wind. Accordingly, the user may select the approach path 203 by appropriate input (cursor, touch, scroll, etc.) to the display. FIG. 3 thus represents the selected approach 203 illustrated on the display, with the non-selected approaches cleared after the user has made the selection.

Figure 4:
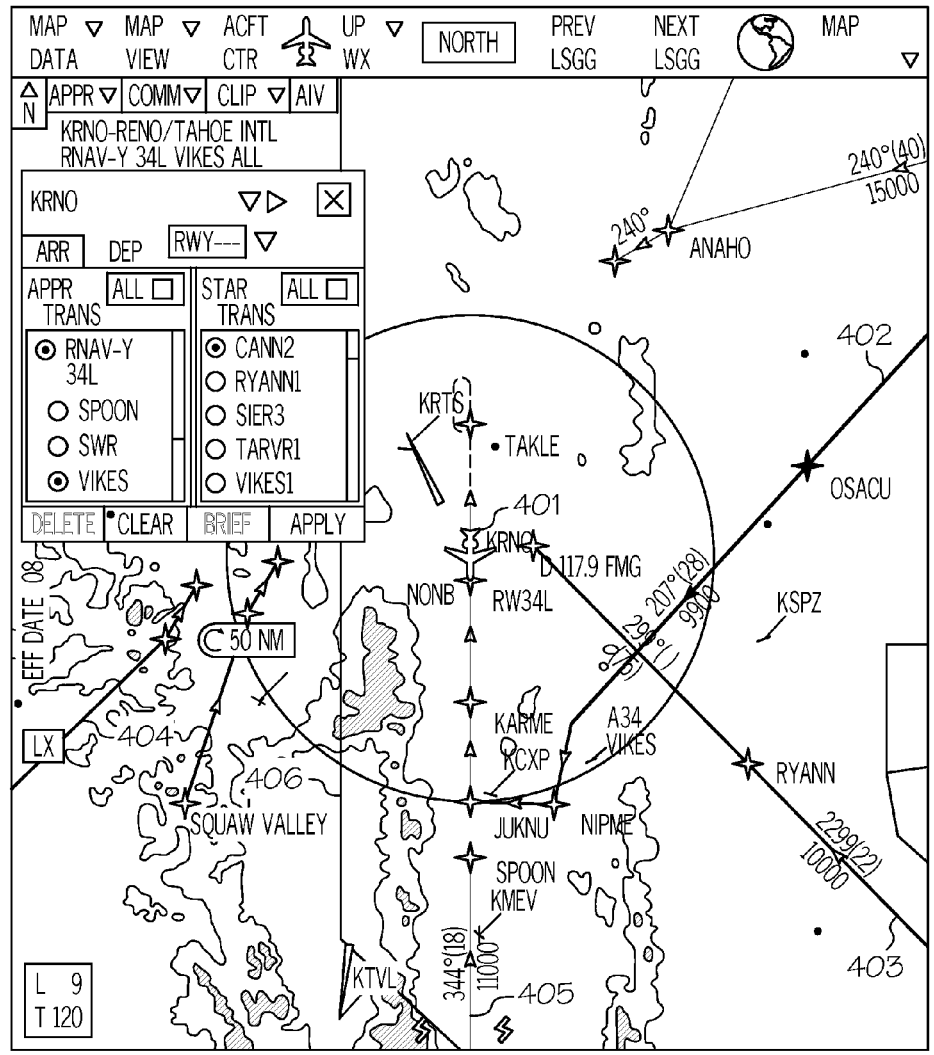

Reference is now made to FIG. 4, which provides an exemplary flight plan analysis display for determining a flight plan preference based at least in part on terrain (obstacle) clearance or avoidance along the flight plan. FIG. 4 shows a display including an aircraft position 401 and a plurality of flight plans in the form of a plurality of approach procedures 402, 403, 404, and 405. Further shown on FIG. 4 is a terrain feature 406, in the form of mountains in the vicinity of the airport (KRNO—Reno/Lake Tahoe International Airport). Here again, the preference may be indicated by visual differentiation among the displayed flight plans 402 through 405. For example, as shown in FIG. 4, flight plan 402 has a thicker line than the other flight plans 403 through 405. Thus, the display indicates, based on the calculated data as indicated above, that flight path 402 is preferred based on one or more of fuel consumption, flight time, and overall operational costs. That is, flight path 402 substantially avoids flight over or around the terrain features 406 by approaching from the northeast, thus reducing fuel consumption, flight time, and overall costs as calculated using the variables noted above.

Figure 5:
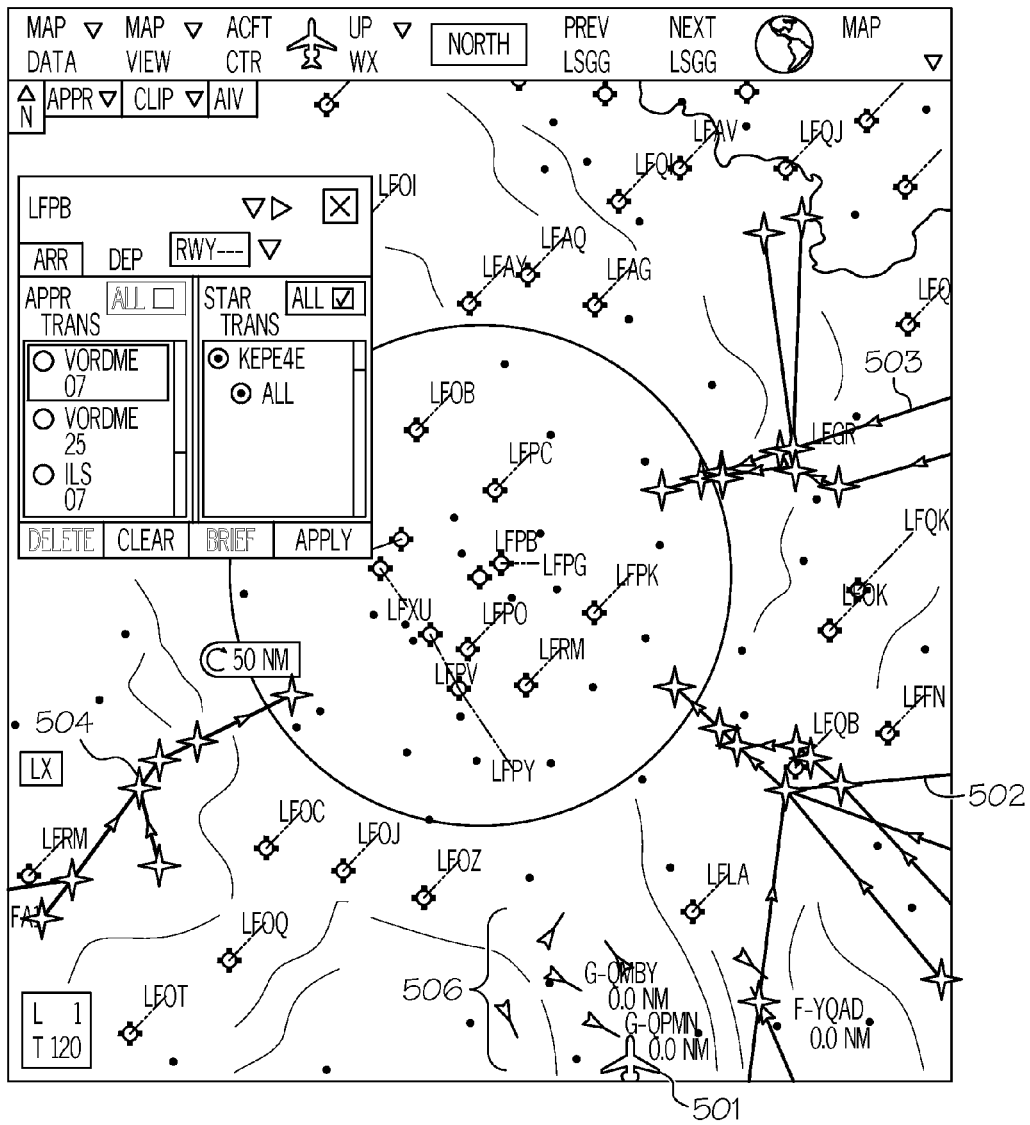

In yet a further example, reference is now made to FIG. 5, which provides an exemplary flight plan analysis display for determining a flight plan preference based at least in part on potential flight delays caused by inbound traffic in the vicinity of an airport. As us known to those having ordinary skill in the art, flight control systems have been developed wherein an aircraft is provided data regarding other aircraft within the vicinity of the aircraft's flight. Such flight control systems include, but are not limited to basic ADS-B transponder-based systems, the "NextGen" air traffic control system currently under development by the Federal Aviation Administration, and the "Single European Sky" air traffic control system currently under development in the European Union, among various other advanced air traffic control systems currently proposed or under development. In general, it is expected that these various control systems, when operational, will provide an aircraft with data regarding the position, speed, altitude, course, and other operational data regarding other aircraft in the vicinity. This data may thus be used to determine the number of aircraft on any given approach path into an airport, any en route flight path, etc.

FIG. 5 shows a display including an aircraft position 501 and a plurality of flight plans in the form of a plurality of approach procedures 502, 503, and 504. Further shown on FIG. 4 is a plurality of aircraft 506 in the vicinity of the aircraft position 501. Here again, the preference may be indicated by visual differentiation among the displayed flight plans 502 through 504. For example, as shown in FIG. 5, flight plan 504 has a thicker line than the other flight plans 502 and 503. Thus, the display indicates, based on the received air traffic data as indicated above, that flight path 504 is preferred based on one or more of fuel consumption, flight time, and overall operational costs. That is, flight path 504 substantially avoids flight in the vicinity of the plurality of other aircraft 506 by approaching from the southwest, thus reducing fuel consumption, flight time, and overall costs as calculated using the variables noted above. That is, by avoiding flight in an area (or along a flight path) where a plurality of other aircraft are known to be flying (possibly in connection with received data concerning such other aircraft's flight paths), it is possible to reduce fuel consumption, flight time, and overall costs that may be encountered by air traffic control requests to reduce flight speed, to hold, or to deviate course as a result of congested airspace.

While the exemplary displays set forth in FIGS. 2-5 have provided examples of preferences (and associated variables) related to wind speed, terrain, and air traffic, it will be appreciated that any flight analysis system in accordance with the present disclosure may provide a combinatorial analysis based on two or more of the above-described factors. For example, a system may take into account both wind speed and terrain, both wind speed and air traffic, both terrain and air traffic, all three factors, or any of the above-described factors plus one or more additional factors as may be desired. Regardless of the basis for the analysis, the display systems provide the user with a simple visual indication (differences in display cues among the various flight paths displayed) to allow the user to select a preferred flight path.

Furthermore, while the exemplary displays set forth in FIGS. 2-5 have provided examples of preference (and associated variables) as equivalent in importance to the flight crew, it will be appreciated that other embodiments may "weigh" various preferences and variables differently. As such, wind speed may be given greater weight than air traffic. Alternatively, terrain may be given greater weight than wind speed. Various other weightings are possible, as desired. In this manner, it becomes possible to generate multiple preferred routes with the route most preferred indicated by, for example, the thickest line, or other suitable visual indication, and next preferred by a thinner line and so forth. The pilot then may select the one he preferred from those presented to him.

In this manner, based on weightings, the pilot may determine why one may be preferred and what reason, fuel, ETA, weather, turbulence, or traffic, or for any other preference or variable. Color and/or line thickness, or other visual indication, is a preferred way to assess and pick the desired route. It also provides the pilot with the greatest amount of information for choosing the optimal route. The pilot can further refine the selection between procedure line segments by hovering the cursor over the procedure segment and then have information "pop-up" or otherwise appear that contains ETA, ETE, ATC Delays, Fuel Required, Estimated Arrival Fuel, etc. This is a particular advantage of displaying all routes into or out of an airport.

In extensions of the present disclosure, it is expected that flight dispatch centers, such as airline dispatch centers, will be able to use the aforementioned analysis techniques to compile a database of preferred flight paths. In this implementation, the flight dispatch center could communicate a preferred flight path to an aircraft in advance of the aircraft's departure, thus allowing the aircraft's flight control systems to have pre-programmed therein a preferred flight route in order to minimize one or more of fuel consumption, flight time, or overall flight operational costs.

Thus, disclosed herein is a system for displaying flight procedure information to an aircrew member of an aircraft. The system includes a moving map display subsystem configured to display a map that moves in a manner that corresponds with a movement of the aircraft, a position detecting subsystem that is configured to detect a current location of the aircraft with respect to a ground surface and to generate a first signal indicative of the current location of the aircraft, and an electronic data storage unit configured to store a plurality of flight path navigation procedures associated with a corresponding plurality of geographic locations. The system further includes a flight path analysis subsystem configured to determine a preferred flight path that will be taken by the aircraft and to generate a second signal indicative of the flight path of the aircraft and a processor operatively coupled with the moving map display subsystem, the position detecting subsystem, the flight path analysis subsystem, and the electronic data storage unit. The processor is configured to receive the first signal from the position detecting subsystem, to receive the second signal from the flight path analysis subsystem, and to retrieve a plurality of flight path navigation procedures from the electronic storage unit, the flight path navigation procedures corresponding with the current location of the aircraft and the flight path of the aircraft. The processor is further configured to command the moving map display subsystem to display a graphic depiction of the plurality of flight path navigation procedures on the moving map display subsystem. The preferred flight path is displayed with a visual cue that visually differentiates the preferred flight path from the other of the plurality of flight paths.

Figure 6:
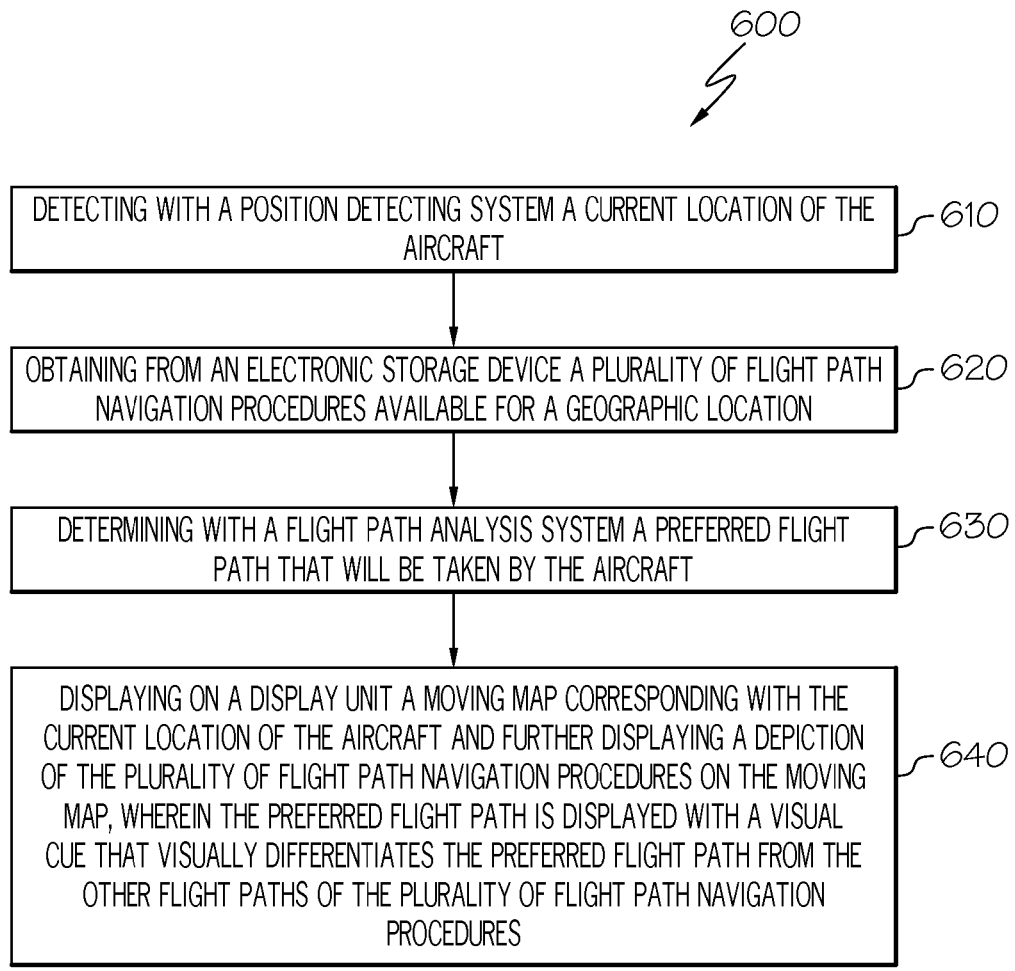
FIG. 6 is a block diagram of an exemplary method for providing a flight plan analysis displaying in accordance with an exemplary embodiment.

Further disclosed herein is an exemplary method of providing a flight plan analysis display. In accordance with an exemplary embodiment of the present disclosure, FIG. 6 depicts such a method 600 in the form of a flowchart. At step 610, the method includes detecting with a position detecting system a current location of the aircraft. At step 620, the method includes obtaining from an electronic storage device a plurality of flight path navigation procedures available for a geographic location. At step 630, the method further includes determining with a flight path analysis system a preferred flight path that will be taken by the aircraft. Still further, at step 640, the method includes displaying on a display unit a moving map corresponding with the current location of the aircraft and further displaying a depiction of the plurality of flight path navigation procedures on the moving map. The preferred flight path is displayed with a visual cue that visually differentiates the preferred flight path from the other flight paths of the plurality of flight path navigation procedures.

In the foregoing examples, flight plan preferences and quantitative variables were visually represented in flight plan analysis display 36 (i.e., estimated fuel consumed, estimate time of arrival, and estimated overall cost); however, it should be appreciated that any suitable number of quantitative variables may be displayed. Furthermore, other types of quantitative variables may be displayed in addition to, or in lieu of, the above-described quantitative variables.

Although an exemplary embodiment of the present invention has been described above in the context of a fully-functioning computer system (i.e., flight plan analysis system 20 described above in conjunction with FIG. 1), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution. Also, as noted above, the invention may take the form of graphical user interface (e.g., ARINC 661) components, which includes a user application definition file (UADF). As will be appreciated by one skilled in the art, such a UADF is loaded into an aircraft display system and defines the "look and feel" of the display, the menu structure hierarchy, and various other static components of the flight plan analysis display.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for displaying flight procedure information to an aircrew member of an aircraft, the system comprising:
    a moving map display subsystem configured to display a map that moves in a manner that corresponds with a movement of the aircraft;
    a position detecting subsystem that detects a current location of the aircraft with respect to a ground surface and to generate a first signal indicative of the current location of the aircraft;
    an electronic data storage unit that stores a plurality of flight path navigation procedures associated with a corresponding plurality of geographic locations, each of the plurality of flight path navigation procedures comprising a line segment or a plurality of connected line segments;
    a flight path analysis subsystem that automatically determines a preferred flight path and generates a second signal indicative of a current flight path of the aircraft, wherein the flight path analysis subsystem determines the preferred flight path automatically based at least in part on one or more of the following: an estimated fuel consumption required to fly the flight path, an estimated flight time required to fly the flight path, an estimated cost required to fly the flight path; and
    a processor operatively coupled with the moving map display subsystem, the position detecting subsystem, the flight path analysis subsystem, and the electronic data storage unit,
    wherein the processor receives the first signal from the position detecting subsystem and receives the second signal from the flight path analysis subsystem, to retrieve a subset of the plurality of flight path navigation procedures from the electronic storage unit that correspond with the current location of the aircraft and the current flight path of the aircraft, and the processor further commands the moving map display subsystem to display a graphic depiction of each of the subset of the plurality of flight path navigation procedures on the moving map display subsystem, wherein the processor cooperates with the flight path analysis subsystem to determine the preferred flight path from among the subset of the plurality of flight paths, and wherein the preferred flight path is automatically displayed with a pre-established visual cue for displaying the preferred flight path that visually differentiates the line segment or the plurality of connected line segments of the preferred flight path from the lines segment or the plurality of connected line segments of others of the subset of the plurality of flight paths.

2. The system of claim 1, wherein the visual cue is a line color differentiation among the plurality of flight paths.

3. The system of claim 1, wherein the visual cue is a line pattern differentiation among the plurality of flight paths.

4. The system of claim 1, wherein the visual cue is a line thickness differentiation among the plurality of flight paths.

5. The system of claim 1, wherein the flight path analysis subsystem is further configured to receive wind speed data and to determine a preferred flight path based at least in part on the wind speed data.

6. The system of claim 1, wherein the flight path analysis subsystem is further configured to receive terrain data and to determine the preferred flight path based at least in part on the terrain data.

7. The system of claim 1, wherein the flight path analysis subsystem if further configured to receive air traffic data and to determine the preferred flight path based at least in part on the air traffic data.

8. The system of claim 1, further including an environmental condition sensor configured to sense an environmental condition around the aircraft.

9. A method for displaying a procedure to an aircrew member of an aircraft, the method comprising the steps of:
    receiving an indication of a criteria for determining a preferred flight path navigation procedure, wherein the criteria include one or more of the following: an estimated fuel consumption required to fly the flight path, an estimated flight time required to fly the flight path, an estimated cost required to fly the flight path;
    detecting with a position detecting system a current location of the aircraft;
    obtaining from an electronic storage device a plurality of available flight path navigation procedures that are available for a geographic location based on the current location of the aircraft;
    pre-determining a visual cue for visually differentiating, on an aircraft display, the preferred flight path navigation procedure from other flight paths of the plurality of available flight path navigation procedures;
    subsequent to the step of pre-determining the visual cue, automatically determining with a flight path analysis system the preferred flight path navigation procedure based on the received indication of the criteria for determining the preferred flight path navigation procedure and the obtained plurality of available flight path navigation procedures; and
    displaying on a display unit a moving map corresponding with the current location of the aircraft and further displaying a depiction of the plurality of available flight path navigation procedures on the moving map including the preferred flight path navigation procedure, wherein each of the plurality of available flight path navigation procedures is displayed as a line segment or a plurality of connected line segments, wherein the preferred flight path is displayed with the pre-determined visual cue that visually differentiates the line segment or the plurality of connected line segments of the preferred flight path from the line segment or the plurality of connected line segments of other flight paths navigation procedures of the plurality of available flight path navigation procedures.

10. The method of claim 9, further comprising receiving wind speed data and to determine a preferred flight path based at least in part on the wind speed data.

11. The method of claim 9, further comprising receiving terrain data and to determine the preferred flight path based at least in part on the terrain data.

12. The method of claim 9, further comprising receiving air traffic data and to determine the preferred flight path based at least in part on the air traffic data.

13. The method of claim 9, wherein the visual cue is a line color, line pattern, or line thickness differentiation among the plurality of flight paths.

14. A method for displaying a procedure to an aircrew member of an aircraft, the method comprising the steps of:
   determining a plurality of available flight path navigation procedures for the aircraft based on a current position of the aircraft and a desired future position of the aircraft;
   pre-determining a first line style for visually displaying a preferred flight path navigation procedure of the plurality of flight path navigation procedures as a line segment or a plurality of connected line segments and a second line style for visually displaying a less preferable flight path navigation procedure of the plurality of flight path navigation procedures as a line segment or a plurality of connected line segments, wherein the first line style differs from the second line style;
   subsequent to pre-determining the first and second line styles, automatically determining the preferred flight path navigation procedure based on one or more of the following flight plan preferences: an estimated fuel consumption required to fly the flight path, an estimated flight time required to fly the flight path, and an estimated cost required to fly the flight path, wherein the preferred flight path navigation procedure represents a flight plan preference minimum value and wherein the less preferable flight path navigation procedure represents a flight plan preference value that is greater than the minimum value; and
   displaying the preferred flight path navigation procedure on a cockpit display of the aircraft using the first line style and displaying the less preferable flight path navigation procedure using the second line style.

15. The method of claim 14, wherein determining the preferred flight path navigation procedure is performed by automatically performing calculations to determine flight plan preference values based on one or more of: a) wind speed data, b) terrain data, and c) air traffic control data.

16. The method of claim 15, wherein determining the preferred flight path navigation procedure is performed by automatically performing calculations based on two or more of a), b) and c) using a combinatorial analysis.

17. The method of claim 16, wherein determining the preferred flight path navigation procedure is performed by automatically performing calculations based on all three of a), b), and c) using a combinatorial analysis.

18. The method of claim 17, wherein performing calculations based on wind speed data comprises analyzing known winds speed(s) and direction(s) in the vicinity of a flight path navigation procedure against direction(s) of flight in accordance with the flight path navigation procedure, wherein performing calculations based on terrain data comprises analyzing an ascend or descent to avoid terrain, and wherein performing calculations based on air traffic control data comprises analyzing the number of other aircraft anticipated to be present along a flight path navigation procedure.

19. The method of claim 18, further comprising pre-determining a third line style for visually displaying a further less preferable flight path navigation procedure of the plurality of flight path navigation procedures as a line segment or a plurality of connected line segments, wherein the third line style differs from both the first line style and the second line style, and wherein a flight plan preference value of the further less preferable flight path navigation procedure is greater than the flight plan preference value of the less preferable flight path navigation procedure.

20. The method of claim 19, wherein the first, second, and third line styles differ from one another on the basis of at least one of a line color, a line pattern, or a line thickness.

* * * * *